United States Patent [19]

Harris

[11] Patent Number: 4,629,560
[45] Date of Patent: Dec. 16, 1986

[54] FUEL FILTER HEAT REGENERATOR

[75] Inventor: Robert S. Harris, Connersville, Ind.

[73] Assignee: Stant Inc., Connersville, Ind.

[21] Appl. No.: 769,767

[22] Filed: Aug. 27, 1985

Related U.S. Application Data

[63] Continuation of Ser. No. 546,994, Oct. 31, 1983, abandoned.

[51] Int. Cl.$^4$ ............................................. B01D 35/18
[52] U.S. Cl. ...................................... 210/184; 123/557
[58] Field of Search ............... 210/181, 184, 186, 175; 123/557

[56] References Cited

U.S. PATENT DOCUMENTS

| 3,962,082 | 6/1976 | Hundal | 210/184 |
| 4,384,962 | 5/1983 | Harris | 210/788 |
| 4,428,351 | 1/1984 | Davis | 210/184 |
| 4,477,345 | 10/1984 | Szlaga, Jr. | 210/184 |

Primary Examiner—John Adee
Attorney, Agent, or Firm—Barnes & Thornburg

[57] ABSTRACT

A regenerative fuel heating device is disclosed for heating fuel prior to the fuel being introduced into a fuel filter, fuel-water separator or both. The device includes a housing and a heater in the housing for heating the fuel. A space defining heat conductive barrier is provided for defining an upstream space in the housing into which fuel can flow to be heated prior to the fuel being introduced into the separator or filter and a downstream space in the housing through which the fuel can flow after the fuel has left the separator or filter. The heater and downstream space are placed in a heat transfer relation with the upstream space to enable the fuel in the upstream space to be heated by the heater and to extract heat from the fuel in the downstream space.

26 Claims, 2 Drawing Figures

FUEL FILTER HEAT REGENERATOR

This application is a continuation of application Ser. No. 06/546,994 filed Oct. 10, 1985, now abandoned.

This invention relates to devices for treating fuel, and more particularly, to devices for heating fuel in vehicles to ensure good cold weather operation.

Internal combustion engines, such as those used in vehicles, require a steady supply of fuel to operate. In cold weather, the steady supply of fuel may be interrupted due to the fuel line becoming clogged due to excessively viscous or frozen fuel. This problem is especially acute in vehicles using diesel fuel. Diesel fuel tends to be more viscous than gasoline. When cold, diesel fuel becomes jelly like due to the formation of paraffin wax crystals. An additional difficulty encountered with diesel fuel is that it is more likely to be more highly contaminated with water than gasoline. The water which is entrained in the diesel fuel can form ice crystals in the fuel line in sub-freezing temperatures. In order to remove this entrained water, diesel fuel should be treated by running the water laden fuel through a fuel-water separator, such as that disclosed in U.S. Pat. No. 4,384,962 to remove the water from the diesel fuel. Additionally, diesel fuel is usually passed through a filter to remove particulate matter entrained in the fuel.

Separators and filters often contain various media such as surface tension discriminators and filters through which the diesel fuel is passed to separate the water and remove the particulates, respectively. The paraffin wax and ice crystals which form in diesel fuel at low temperatures can plug these media in the separators and filters, and thereby halt fuel flow through the separators and filters and consequently halt engine operation. The low-micron particulate filters found in fuel filters are especially adversely effected. Although chemical additives can partially alleviate the problems caused by jelly-like or frozen diesel fuel, fuel heating is the preferred method of ensuring reliable performance.

Electrically operated fuel heaters are known and are generaly accepted as offering the fast response necessary for passenger vehicle diesel applications. One such fuel heater is disclosed in U.S. patent application Ser. No. 457,010 filed Jan. 10, 1983, now U.S. Pat. No. 4,477,345. Passenger vehicles, however, often do not have sufficiently powerful electrical systems to provide electricity to the fuel heater while still providing electrical power to other accessories.

One object of the instant invention is to provide a fuel heating device which heats fuel more efficiently by extracting heat from the fuel after the fuel has already been passed through a filter or separator, or both. Once fuel has already passed through an element in the fuel line such as the filter and/or separator, heating is no longer necessary. Heat is extracted from the previously filtered and/or separated fuel to preheat incoming cold fuel prior to introducing the cold fuel into the separator or filter.

In accordance with the instant invention, a device is provided for heating fuel prior to the fuel being introduced into an element in a fuel line. The device includes a housing and a heating means in the housing. A space defining means is provided for defining an upstream space in the housing into which fuel flows to be heated prior to being introduced into the element, and a downstream space housing through which the fuel flows after it has left the element. The downstream space is in a heat transfer relation with the upstream space so that heat is transferred from the fuel in the downstream space to heat the fuel in the upstream space.

Illustratively, the device includes a first space, a second space and a third space in the housing with the spaces being defined by a first and second heat conductive barrier. The heating means comprises a heater probe disposed adjacent the inner space. The heater probe is in a heat transfer relation with the second space to heat fuel in the second space.

One aspect of the instant invention is that heat is transferred from previously heated fuel, which no longer needs to be heated, to heat the cold fuel entering the device. By transferring heat from previously heated fuel, to heat incoming cold fuel, the incoming fuel can be heated faster with less electricity. Thus, the instant invention improves the efficiency of the heater.

As discussed above, the electrical load pulled on a passenger vehicle's electrical system by some prior art fuel heaters is large enough to hinder the operation of the vehicle's other electrically operated accessories. A heater probe used in conjunction with the instant invention can heat fuel to a desired temperature, using less electricity since the probe is being aided in its efforts to heat the fuel by the previously heated fuel. Once the previously heated fuel is passed through the fuel line elements, such as a separator and filter, it no longer needs to remain at an elevated temperature.

One feature of the instant invention is that a single heater probe can be used to heat fuel for two fuel-treating devices, with the fuel being heated before it enters each of the two fuel-treating devices. This feature has the advantage of heating the fuel immediately before the fuel enters each of the two fuel-treating devices, without necessitating the use of two heater probes. The device is designed to apply the maximum heat to the fuel prior to the fuel entering the fuel-treating device which is likely to be most adversely affected by the increased viscosity of cold fuel. Normally, this will be the fuel filter. Fuel filters commonly use 5 to 15 micron filters which can become plugged by cold, viscous diesel fuel.

Another feature of the instant invention is that the heater probe and heat conductive space-defining barriers can be selectively attachable to the housing. This feature has the advantage of enabling the user to replace either the heater probe or the heat-conductive barriers, or both, without having to replace the entire device.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
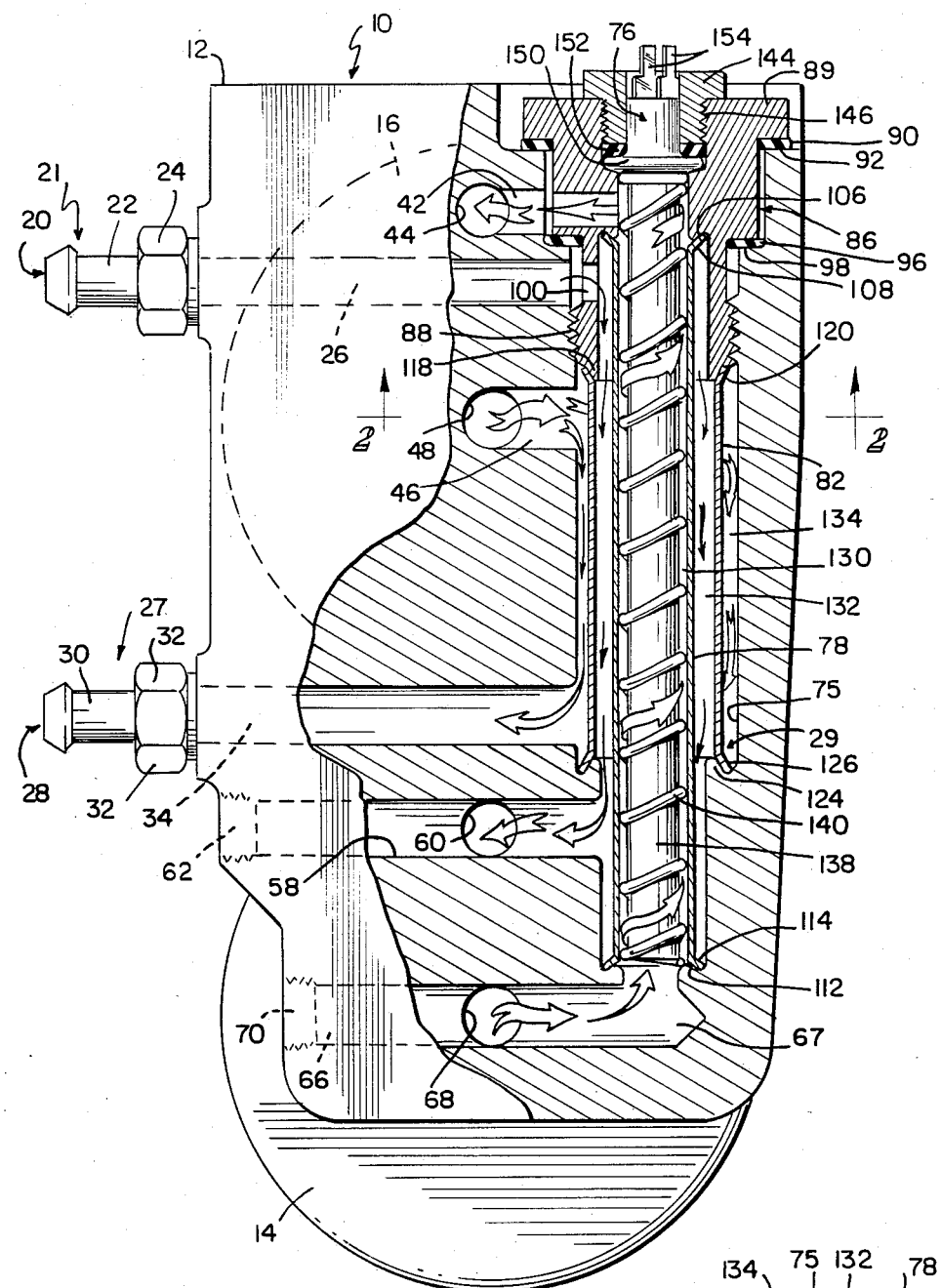
FIG. 1 is a top view, partly broken away, of the present invention.

A regenerative fuel heater 10 which is shown in the figures includes a housing 12. Fuel heater 10 is used in conjunction with, and disposed above, a pair of fuel-treating devices such as fuel-water separator 14 and fuel filter 16. Both fuel-water separator 14 and fuel filter 16 include media (not shown) which can become clogged by frozen or jellied diesel fuel which occurs when the temperature drops below a certain level.

Housing 12 includes a first entry port 20 through which fuel can enter the housing 12. First entry port 20 includes a fitting 21 having a nipple portion 22 to which a fuel line (not shown) can be attached, and a bolt portion 24 which includes threads (not shown) which can be threadably received by threads (not shown) in the housing 12. Entry port 20 opens into a radially extending entrance passageway 26 which directs fuel into an axially extending cavity 29. A first exit port 28 also includes a fitting 27 having a nipple 30 and a bolt portion 32. First exit port 28 opens into a radially extending exit passageway 34 which extends through housing 12 to cavity 29. A fuel line (not shown) can be attached to nipple 30 for conducting fuel from the fuel heater 10 to another portion of the fuel system, such as the fuel injectors or cylinders.

Figure 2:
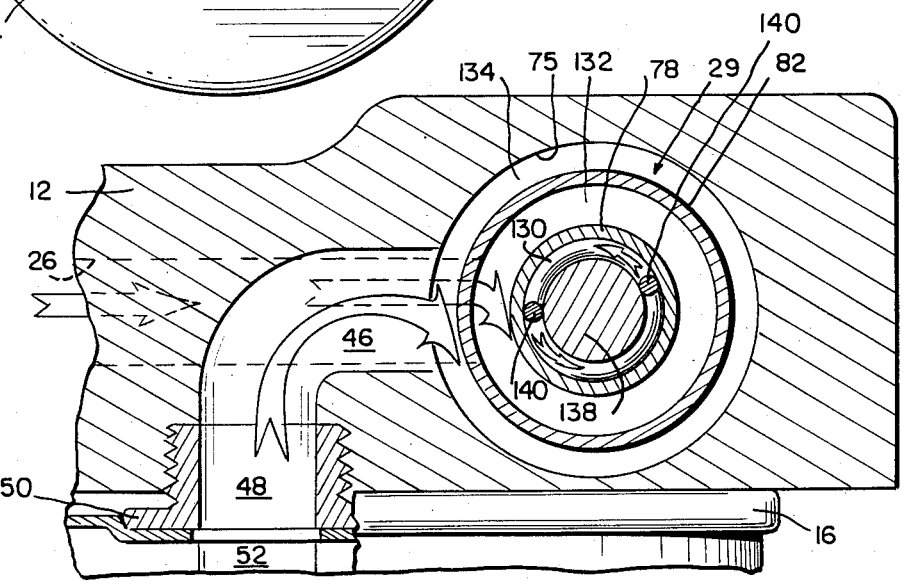
FIG. 2 is a cross-sectional view of the present invention taken along lines 2—2 of FIG. 1.

A radially extending filter introductory passageway 42 is formed in housing 12 and includes an aperture 44 which is alignable and mateable with the entry port (not shown) of filter 16 to conduct fuel from cavity 29 into filter 16. A radially extending filter withdrawing passageway 46 is provided for conducting fuel from the fuel filter 16 to the cavity 29. As best shown in FIG. 2, filter-withdrawing passageway 46 includes an aperture 48 which is alignable with the exit port 52 of filter 16. Threaded mating plug 50 is provided for mating aperture 48 to exit port 52.

A radially extending separator introductory passageway 58 extends from cavity 29 to the edge of housing 12, and includes an aperture 60 for placing the passageway 10 in fluid communication with the entry port (not shown) of separator 14. A plug 62 is threadably received into the end of separator introductory passageway 58 to seal the end of the passageway 58. A radially extending separator withdrawing passageway 66 extends from the terminus 67 of cavity 29 to the side of housing 12 and includes an aperture 68 to place the passageway 66 in fluid communication with the exit port (not shown) of separator 14. Radially extending separator withdrawing passageway 66 conducts fuel from the exit port (not shown) of separator 14 to the cavity 29 of housing 12. A plug 70 is threadably received in the end of passageway 66 to seal the passageway 66.

Axially extending cavity 29 is generally cylindrical in shape, having a diameter which varies along its length, and a wall 75 which defines the outer boundaries of the cavity 29. The wall 75 is constructed of a material such as cast aluminum. A heating means 76, a first space-defining barrier such as cylindrical sleeve 78, and a second space-defining barrier such as cylindrical sleeve 82 are axially disposed in cavity 29, and are generally collinear with the long axis of cavity 29. Sleeves 78, 82 are preferably constructed of a heat-conductive material, such as aluminum or stainless steel, which will allow heat to be transferred through the sleeves 78, 82. Sleeves 78, 82 are held in place at one end by a retaining fitting 86 which is threadably received by radially inwardly facing threads 88 which are formed on the wall 75 of cavity 29. Retaining fitting 86 includes a head 89 which may be hexagonally shaped to enable the head 89 to be gripped by a wrench for enabling the user to remove fitting 86 from and engage fitting 86 into threads 88. A first seal 90 is disposed on a first, axially outwardly facing annular ridge 92 between retaining fitting 86 head 89 and housing 12 to prevent material from entering or leaving cavity 29. A second seal 96 is disposed on second axially outwardly facing annular ridge 98 to prevent material in cavity 29 from moving outwardly past the seal 96. An aperture 100 is formed in retainer 86, axially outwardly of threads 88, to place entrance passageway 26 in fluid communication with cavity 29.

Retaining fitting 86 includes an axially inwardly facing annular lip 106 which serves as a seat for a first flanged end 108 of first barrier 78. Annular lip 106 is aligned with an axially outwardly facing annular lip 112 which is formed in cavity wall 75. Annular lip 112 forms a seat for a second outwardly flanged end 114 of first barrier 78. An axially inwardly facing circular rim 118 is formed on the axially inner end of retaining fitting 86 to form a seat for the first flanged end 120 of second barrier sleeve 82. Circular rim 118 is alignable with an axially outwardly facing annular lip 124 formed in the wall 75 of cavity 29. Annular lip 124 serves as a seat for the second flanged end 126 of second barrier 82.

First 130, second 132, and third 134 concentrically arranged spaces are formed in the cavity 29 by the placement of barriers 78, 82 and retaining fitting 86 in cavity 29. First (intermediate) space 130 is disposed radially inwardly of second space 132, and second (upstream) space 132 is disposed radially inwardly of third (downstream) space 134. Due to the positioning of the barrier sleeves 78, 82, seals 90, 96 and the seating of the ends 108, 114, 120, 126 of barriers 78, 82 on lips 106, 112, rim 118 and lip 124, respectively, the spaces 130, 132, 134 are formed so that fuel in the spaces 130, 132, 134 will not commingle. The heat-conductive nature of sleeves 78, 82 places the three spaces 130, 132, 134 in a heat-transfer relation so that heat can be transferred among fuel in the three spaces 130, 132, 134.

Heating means 76 includes a longitudinal heater probe 138 which is disposed radially inwardly of first sleeve 78. A spiraling coil turbulence-inducing means 140 spirally encircles the outside of heater probe 138, and is in physical contact with both heater probe 138 and first barrier sleeve 78. Spiraling coil 140 is preferably constructed of a heat conductive material such as stainless steel.

The first inner space 130 is defined generally by the heater probe 138, coil 140 and the inner surface of the first barrier sleeve 78. The second space 132 is defined generally by the outer surface of the first barrier sleeve 78 and the inner surface of the second barrier sleeve 82. The third space 134 is defined generally by the outer surface of the second barrier sleeve 82 and that portion of wall 75 opposite second barrier sleeve 82.

The spiraling coil 140 causes the fuel in first space 130 to flow spirally and turbulently around heater probe 138 to increase the contact of the fuel with heater probe 138. The coil 140 also provides a direct physical contact between heater probe 138 and barrier 78 to promote the heating of barrier 78, so that heat is transferred through barrier 78 to heat the fuel in second space 132.

Heater probe 138 includes a threaded fitting 144 which is threadably received by the internal threads 146 of retaining fitting 86. Heater probe 138 also includes a retainer 150 which positions heater probe 138 in the first barrier sleeve 78, and a seal 152 which prevents fuel in first space 130 from seeping through the internal threads 146 of retaining fitting 86. A pair of wires 154 are coupled to the heater probe 138 to provide a point of attachment for a source (not shown) of electricity to operate heater probe 138.

The regenerative fuel heater 10 operates as follows. Fuel flows from a fuel line (not shown) through entry port 20 into and through entrance passageway 26, through aperture 100 in retaining fitting 86 and into second (upstream) space 132. The fuel flows through second space 132 where it is heated on one side by the heat transferred from first space 130 by barrier sleeve 78, and on the other side by second barrier sleeve 82 which transfers heat from fuel flowing through third (downstream) space 134. The heater probe 132 which is in physical contact, and hence in a heat-transfer relation with metal spiraling coil 140, transfers heat convectively to spiraling coil 140. Because of its physical contact and heat-transfer relation with barrier 78, spiraling coil 140 transfers heat to barrier 78. The heating of barrier 78 causes fuel in second space 132 to become heated. At the same time, hot fuel which is flowing through third space 134, is in a heat-transfer relation with second barrier sleeve 82 which transfers heat to the fuel in second space 132. As the fuel in the second space is unheated before entering second space 132, the fuel in second space 132 will generally be colder than the fuel in either first space 130 or third space 134. Thus, the fuel in second space 132 is heated by fuel in both first space 130 and third space 134 before the fuel from second space 132 is delivered to the radially extending separator introductory passageway 58 and is directed through aperture 60 into the entry port (not shown) of separator 14.

Fuel travels through separator 14 where water, which is entrained in the fuel, is separated from the fuel. The dry fuel then leaves separator 14 through the separator 14 exit port (not shown), travels through aperture 68 into radially extending separator withdrawing passage 66, into the terminus 67 of cavity 29 and into first space 130.

The fuel in first space 130 follows a spiraling path around heater probe 138. This spiraling path taken by the fuel in first space 130 induces turbulence in the flow of fuel in space 130 and maximizes the contact of the fuel in first space 130 with heater probe 138 which in turn maximizes the heating of the fuel by heater probe 138. The intimate contact of the fuel with the heater probe 138 in first space 130 causes the fuel to reach its maximum temperature in first space 130. By so doing, the fuel is at its least viscous, and has the least chance of being crystallized or jelly-like. This least-viscous state is achieved immediately prior to the entrance of the fuel into fuel filter 16 via passageway 42 and aperture 44. The heat of the fuel is maximized immediately before the fuel is directed into filter 16 because the filter 16 is more likely than the separator 14 to be affected adversely by the presence of jelly-like or crystallized fuel. Specifically, the 5 to 15 micron sized filter openings required for particulate removal are the most likely spot in the fuel system to become plugged or clogged by the jellied or crystallized fuel.

After passing through filter 16, the fuel exits through filter exit port 52, through aperture 48, and into passageway 46. From passageway 46, the fuel is directed into third space 134. The fuel in third space 134, having recently been maximally heated in first space 130, emerges from filter 16 into third space 134 at a higher temperature than the fuel freshly introduced into the heater 10 which is flowing through second space 132. The cold fuel in second space 132 will extract heat from the relatively warmer fuel in third space 134 through second barrier sleeve 82. This heat extraction by the fuel in second space 132 cools the fuel in third space 134 while warming the fuel in second space 132. The somewhat cooler fuel in third space 134 is then directed through exit passageway 34 and out the exit port 28 of heater 10 and into the fuel injectors and ultimately into the cylinders of the vehicle's engine (not shown).

Although the invention has been described in detail with reference to certain preferred embodiments and specific examples, variations and modifications exist within the scope and spirit of the invention as described and as defined in the following claims.

What is claimed is:

1. A fuel line heating system for a vehicle having a fuel line including an upstream portion and a downstream portion, a first fuel treatment element, and a second fuel treatment element, each fuel treatment element having an inlet port and an outlet port, the fuel line heating system comprising first passageway means for conducting fuel from the upstream portion of the fuel line to the inlet port of the first fuel treatment element, second passageway means for conducting fuel from the outlet port of the first fuel treatment element to the inlet port of the second fuel treatment element, heater means for heating fuel conducted through the second passageway means, and third passageway means for conducting fuel from the outlet port of the second fuel treatment element to the downstream portion of the fuel line, the first passageway means being situated adjacent to both of the second and third passageway means in heat transferring relation causing fuel conducted through the first passageway means to be warmed prior to being introduced from the first passageway means into the first fuel treatment element due to exposure to heat energy transferred from the fuel that is conducted through the second and third passageway means and heated during exposure to the heater means.

2. The fuel line heating system of claim 1, wherein the first and second passageway means cooperate to define a first heat conductive barrier therebetween and the first and third passageway means cooperate to define a second heat conductive barrier therebetween.

3. The fuel line heating system of claim 2, wherein the second heat conductive barrier is an elongated cylinder positioned to surround the first heat conductive barrier in spaced relation thereto.

4. The fuel heating system of claim 3, wherein the first heat conductive barrier is an elongated cylinder, and the elongated cylinders of the first and second heat conductive barriers are aligned concentrically one to another.

5. The fuel line heating system of claim 2, wherein the first heat conductive barrier is an elongated cylinder and the heater means includes an elongated heating element disposed in the elongated cylinder in spaced-apart relation to the elongated cylinder to heat fuel conducted through the space between the heating element and the cylinder.

6. The fuel line heating system of claim 5, further comprising means for inducing turbulent flow in the fuel conducted through the second passageway means to increase heat exchanging contact of the fuel with the heating element, the inducing means being positioned in the space between the heating element and the cylinder.

7. The fuel line heating system of claim 5, further comprising bridge means for conductively transferring heat from the heating element to the first heat conductive barrier across the space therebetween to aid in warming fuel conducted through the first passageway means.

8. The fuel line heating system of claim 5, further comprising coil means for inducing turbulent flow in the fuel conducted through the second passageway means to increase heat exchanging contact of the fuel with the heating element and for conductively transferring heat energy from the heating element to the first heat conductive barrier to promote heating of the barrier so that heat energy is transferred through the barrier to warm fuel conducted through the first passageway means.

9. The fuel line heating system of claim 5, wherein the heating element includes a generally cylindrically shaped outer surface, and further comprising a helical coil developed about the cylindrically shaped outer surface to induce turbulent flow in fuel conducted through the space between the elongated heating element and the elongated cylinder.

10. The fuel line heating system of claim 9, wherein the helical coil is positioned in touching relation to both the heating element and the elongated cylinder to conduct heat energy therebetween.

11. A fuel line heating system for a vehicle having a fuel line, a first fuel treatment element, and a second fuel treatment element, each fuel treatment element having an inlet port and an outlet port, the fuel line heating system comprising
a housing including an upstream fuel pipe having an inlet orifice for admitting fuel from the fuel line, a downstream fuel pipe having an outlet orifice for discharging fuel back into the fuel line, and an interior wall definging a cavity in fluid communication with the upstream and downstream fuel pipes,
heater means for heating fuel in the housing, the heater means being fixed to the housing to extend into the cavity,
a first heat conductive barrier surrounding the heater means in spaced-apart relation,
a second heat conductive barrier surrounding the first heat conductive barrier in spaced-apart relation to define a first fuel distribution passageway therebetween, the first heat conductive barrier and the heater means cooperating to define a second fuel distribution passageway therebetween, the second heat conductive barrier lying in spaced-apart relation to the interior wall of the housing to define a third fuel distribution passageway therebetween,
upstream means for conducting fuel from the upstream fuel pipe to the inlet port of the first fuel treatment element via the first fuel distribution passageway,
intermediate means for conducting fuel from the outlet port of the first fuel treatment element to the inlet port of the second fuel treatment element via the second fuel distribution passageway so that fuel conducted through the second fuel distribution passageway is heated due to exposure to the heater means, and
downstream means for conducting fuel from the outlet port of the second fuel treatment element to the downstream fuel pipe via the third fuel distribution passageway so that heat energy is transferred from the heated fuel conducted through both the intermediate means and the downstream means to the fuel conducted through the upstream means via the first and second heat conductive barriers, whereby fuel is pre-heated prior to being introduced into a fuel treatment element in the vehicle fuel line.

12. The fuel line heating system of claim 11, wherein the first heat conductive barrier is an elongated cylinder and the heater means includes an elongated heating element disposed in the elongated cylinder in spaced-apart relation to the elongated cylinder to heat fuel conducted through the space between the heating element and the cylinder.

13. The fuel line heating system of claim 12, wherein the elongated cylinders of the first and second heat conductive barriers are aligned concentrically one to another.

14. The fuel line heating system of claim 11, further comprising means for inducing turbulent flow in the fuel conducted through the second fuel distribution passageway to increase heat exchanging contact of the fuel with the heating element, the inducing means being postponed in the second fuel distribution passageway intermediate the heating element and the cylinder.

15. The fuel line heating system of claim 11, further comprising bridge means for conductively transferring heat from the heating element to the first heat conductive barrier to aid in warming fuel conducted through the first fuel distribution passageway.

16. The fuel line heating system of claim 11, further comprising coil means for inducing turbulent flow in the fuel conducted through the second fuel distribution passageway to increase heat exchanging contact of the fuel and the heating element and for conductively transferring heat energy from the heating element to the first heat conductive barrier to promote heating of the barrier so that heat energy is transferred through the barrier to warm fuel conducted through the first fuel distribution passageway.

17. The fuel line heating system of claim 11, wherein the heating element includes a generally cylindrically shaped outer surface, and further comprising a helical coil developed about the cylindrically shaped outer surface to induce turbulent flow in the fuel conducted through the second fuel distribution passageway.

18. The fuel line heating system of claim 17, wherein the helical coil is positioned in touching relation to both the heating element and the elongated cylinder to conduct heat energy therebetween.

19. A fuel heating system for a vehicle having a fuel line, a first fuel treatment element, and a second fuel treatment element, each fuel treatment element having an inlet port and an outlet port, the fuel heating system comprising
a housing including an upstream fuel pipe having an inlet orifice for admitting fuel from the fuel line and a downstream fuel pipe having an outlet orifice for discharging fuel back into the fuel line,
first passageway means for conducting fuel from the upstream fuel pipe to the inlet port of the first fuel treatment element,
second passageway means for conducting fuel from the outlet port of the first fuel treatment element to the inlet port of the second fuel treatment element,
heater means for heating fuel conducted through the second passageway means, and
third passageway means for conducting fuel from the outlet port of the second fuel treatment element to the downstream fuel pipe, the first passageway means being situated adjacent to both of the second and third passageway means in heat transferring relation causing fuel conducted through the first passageway means to be warmed prior to being introduced from the first passageway means into the first fuel treatment element due to exposure to heat energy transferred from the fuel that is conducted through the second and third passageway means and heated during exposure to the heater means.

20. The fuel line heating system of claim 19, wherein the first and second passageway means cooperate to define a first heat conductive barrier therebetween and the first and third passageway means cooperate to define a second heat conductive barrier therebetween.

21. In a vehicle having a fuel line providing means for conducting fuel along a continuous path, a fuel heating system comprising first, second, and third passageway means for conducting fuel, first and second fuel treatment elements, a selected portion of the fuel line being provided by, in sequence, the first passageway means, the first fuel treatment element, the second passageway means, the second fuel treatment element, and the third passageway means, and heater means for heating fuel conducted through the second passageway means, the first, second, and third passageway means being aligned in close proximity to one another in heat transferring relation so that heat energy from the heated fuel being conducted through the second and third passageway means is transferred to the fuel being conducted through the first passageway means causing fuel in the fuel line to be warmed prior to being introduced into the first fuel treatment element and into the second passageway means.

22. The fuel heating system of claim 21, wherein each of the first, second, and third passageway means includes a heat transfer portion, and a heat transfer portion of the first passageway means is situated intermediate the heat transfer portions of the second and third passageway means to establish the heat transferring relation between the first, second, and third passageway means.

23. The fuel heating system of claim 22, wherein the heat transfer portion of the third passageway means surrounds the heat transfer portion of the first passageway means and the heat transfer portion of the first passageway means surrounds the heat transfer portion of the second passageway means so that fuel being conducted through the first passageway means is exposed to heat energy of fuel heated due to exposure to the heater means of the second passageway means being conducted through the surrounding third passageway means and the circumscribed second passageway means.

24. The fuel heating system of claim 22, wherein the heat transfer portions of the first and second passageway means cooperate to define a first heat conductive barrier therebetween and the heat transfer portions of the first and third passageway means cooperate to define a second heat conductive barrier therebetween so that fuel being conducted through the first passageway means is exposed to heat energy of fuel heated due to exposure to the heater means in the second passageway means being conducted through the second and third passageway means.

25. The fuel heating system of claim 24, wherein the second heat conductive barrier is an elongated cylinder positioned to surround the first heat conductive barrier in spaced relation thereto.

26. The fuel heating system of claim 24, wherein the first heat conductive barrier is an elongated cylinder, the second heat conductive barrier is an elongated cylinder positioned to surround the first heat conductive barrier in spaced relation thereto, and the elongated cylinders of the first and second heat conductive barriers are aligned concentrically one to another.

* * * * *